(No Model.)

M. N. NARUM.
WHEEL HUB.

No. 547,023. Patented Oct. 1, 1895.

Witnesses:
Geo W Irwin
Chas L Goss

Inventor:
Martin N Narum
By Winkler Flanders Smith Bottum
Attorneys.

UNITED STATES PATENT OFFICE.

MARTIN N. NARUM, OF MILWAUKEE, WISCONSIN.

WHEEL-HUB.

SPECIFICATION forming part of Letters Patent No. 547,023, dated October 1, 1895.

Application filed November 2, 1894. Serial No. 527,710. (No model.)

*To all whom it may concern:*

Be it known that I, MARTIN N. NARUM, of Milwaukee, in the county of Milwaukee and State of Wisconsin, have invented certain new and useful Improvements in Wire-Wheel Hubs; and I do hereby declare that the following is a full, clear, and exact description of the invention, which will enable others skilled in the art to which it pertains to make and use the same, reference being had to the accompanying drawing, and to the letters of reference marked thereon, which form a part of this specification.

The main object of the invention is to simplify and improve the construction of hubs for bicycle or wire wheels.

It consists, essentially, of a hub composed or constructed of sections, as hereinafter particularly described, and pointed out in the claims.

In the accompanying drawings like letters designate the same parts in the several figures.

Figure 1:
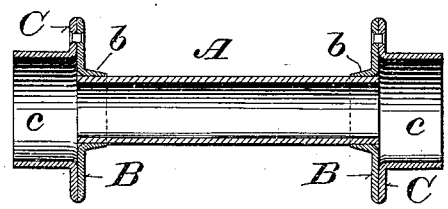
Figure 2:
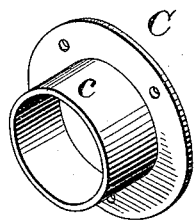
Figure 3:
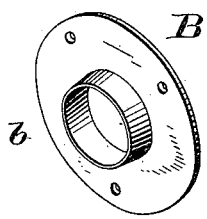
Figure 4:
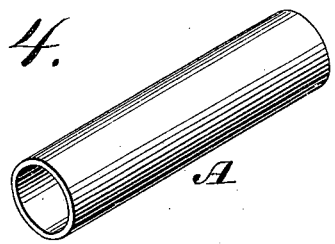

Figure 1 is a central longitudinal section of a hub constructed in accordance with my invention, and Figs. 2, 3, and 4 are perspective views of the several parts of which the hub is composed or constructed.

A is a metal tube constituting that part of the hub between the spoke-flanges.

B B are flange-sections, which may be conveniently formed by dies from flat disks of sheet metal with collars or rims $b$ $b$ around the central openings, which are fitted upon the ends of the tube A, to which they are brazed or otherwise attached, as shown in Fig. 1.

C C are the other flange-sections, which may be conveniently formed in a like or similar manner from disks of sheet metal with rims $c$ $c$ around the openings therein of larger diameter than the diameter of tube A, or they may be made from a tube of about the same diameter as the rims $c$, cut to the required lengths and flanged. These flange-sections are brazed or riveted or otherwise attached to the outer faces of the sections B concentrically therewith, and their outwardly-projecting rims $c$ constitute the ends of the hub and housings for the ball-bearings on which it turns. After the parts are assembled and secured together, as shown in Fig. 1 and hereinbefore described, the flanges are punched or drilled parallel with the axis of the hub for the attachment of wire spokes in the usual or any suitable manner, and the hub may be smoothed and finished, so as to obliterate the joints between the several component sections. A hub is thus produced which is light, strong, and easy to make. Extra thickness is given to the flanges where strength and rigidity are required for the attachment of the spokes without weakening other parts of the hub and without waste of time and material.

I am aware that wire-wheel hubs of like or similar shape have been made from solid blocks or blanks by turning and boring operations; but this mode of manufacture is wasteful of time and material. Similar hubs have also been made integrally from tubing cut to required lengths; but this method is not economical, because many hubs thus made are spoiled by undue straining of the metal in shaping it to the required form. Besides, they are weak and defective at the junction between the flanges and body or tubular portion, where strength and rigidity are especially desirable.

I am aware, also, that sectional metallic hubs have been made heretofore; but so far as I am aware the component parts of such hubs have not been formed and joined as herein described and claimed, so as to produce a hub of the shape and style shown in the accompanying drawings and to fully secure the advantages hereinbefore set forth.

I claim—

1. A hub for bicycle or wire-wheels composed of a tubular section and of separate flange sections for the attachment of spokes, having their inner faces attached to each other, and formed on opposite sides with outwardly projecting concentric rims approximately perpendicular thereto, the rims on the inner sections being fitted upon and attached to the ends of the tubular section with the flanges approximately perpendicular to its axis, substantially as and for the purposes set forth.

2. A hub for bicycle or wire-wheels composed of a plain tubular section and of flange sections for the attachment of spokes, having their inner faces attached to each other, and formed on the outer side with outwardly projecting concentric rims approximately perpendicular thereto, the rims of the outer sections being of larger diameter than the tubular section and constituting housings for the bearings of the hub, and the rims of the inner sections being fitted upon and attached to the ends of the tubular section with the flanges approximately perpendicular to its axis, substantially as and for the purposes set forth.

3. A hub for bicycle or wire-wheels composed of a plain tubular section of uniform diameter throughout its length, and of flange sections for the attachments of spokes, having their inner faces brazed together and formed on opposite sides with outwardly projecting concentric rims constituting housings around the openings in the ends of the tubular section, the rims of the outer sections being of larger diameter than the said tubular section, and the rims of the inner sections being fitted upon and brazed to the ends of the tubular section with flanges approximately perpendicular to its axis, substantially as and for the purposes set forth.

In testimony that I claim the foregoing as my own I affix my signature in presence of two witnesses.

MARTIN N. NARUM.

Witnesses:
CHAS. L. GOSS,
M. L. EMERY.